March 18, 1958  J. ARIETTI  2,827,024
COMBUSTION CYCLE TURBINE ENGINE
Filed Aug. 8, 1957
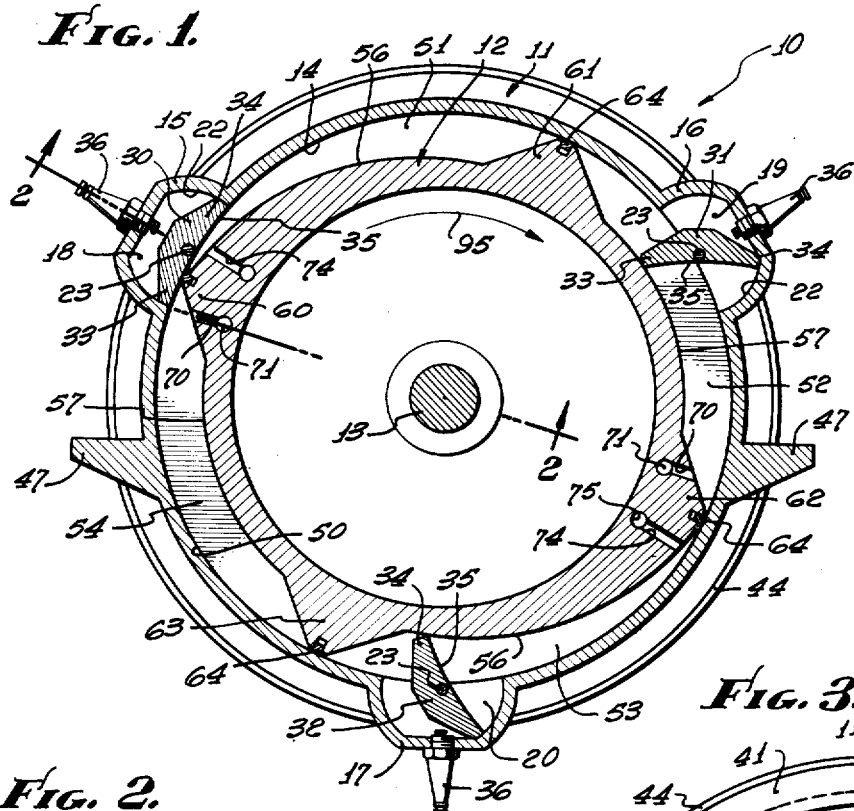
Fig. 1.
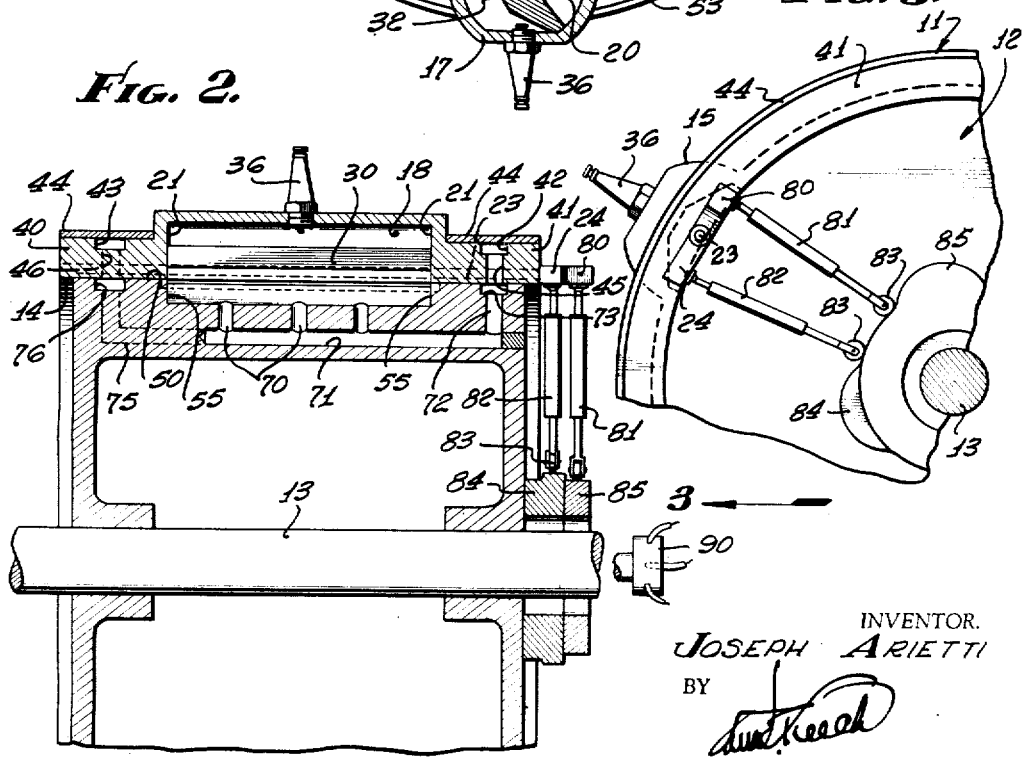
Fig. 2.
Fig. 3.
INVENTOR.
JOSEPH ARIETTI
BY
ATTORNEY.

United States Patent Office 2,827,024
Patented Mar. 18, 1958

2,827,024

COMBUSTION CYCLE TURBINE ENGINE

Joseph Arietti, Lancaster, Calif.

Application August 8, 1957, Serial No. 677,153

5 Claims. (Cl. 123—15)

This invention relates to rotary engines and particularly to a novel combustion cycle turbine engine.

It is a particular object of the invention to produce a compact internal combustion rotary engine having a relatively low weight per horsepower produced.

It is another object of the invention to produce such an engine which operates by the four-cycle method to perform the four functions of fuel suction, fuel compression, fuel combustion, and exhaust of combustion products, and which accomplishes these functions by inter-related elements provided on a stator with a cylindrical bore, and a cylindrical rotor rotating within and in close fitting relation with said bore.

It is yet another object of the invention to produce such an engine which performs its operations in the same radial plane and which will produce six or more four-cycle operations during each revolution of the rotor.

The manner of accomplishing the foregoing objects as well as further objects and advantages will be made manifest in the following description taken in connection with the accompanying drawings in which:

Fig. 1 is a diagrammatic cross-sectional view of a preferred embodiment of the engine of the present invention.

Fig. 2 is a diagrammatic fragmentary longitudinal sectional view taken on the line 2—2 of Fig. 1.

Fig. 3 is a diagrammatic fragmentary end elevational view taken in the direction of arrow 3 in Fig. 2.

Referring specifically to the drawings, the invention is there shown as embodied in a combustion cycle turbine engine 10 which consists principally of two main parts, a stator 11 and a rotor 12. The rotor 12 is mounted on a shaft 13 which journals in suitable bearings (not shown) which are provided on a common mounting with the stator 11.

An annular internal bore 14 is provided in the stator 11 into which bore the rotor 12 extends axially so as to fit closely within said bore and thus prevent substantial escape of gases from between the stator 11 and rotor 12 as said rotor rotates.

The stator 11 is provided with three bosses 15, 16 and 17 which are uniformly spaced apart by angles of 120° about the axis of the stator. These bosses have compression chambers 18, 19 and 20 which are formed radially outwardly from the bore 14. Each of the chambers 18, 19 and 20 have end walls 21 which lie in planes normal to the axis of the stator and side walls 22 which comprise sections of a cylinder which is coaxial with a valve shaft 23 which extends through the chamber in which it is disposed parallel with and close to the bore 14. Each of the shafts 23 extends at one end thereof from the stator 11 and has a rocker 24 mounted thereon.

Fixed on the shafts 23 within the chambers 18, 19 and 20 are rotary butterfly valves 30, 31 and 32. Each of these valves makes a close sliding fit at its ends with the walls 21 of the chamber in which it is mounted. Each valve also has end wings 33 and 34 which make a close sliding fit with the cylindrical surfaces 22 of the chamber in which this valve is mounted. Each of the valves 30, 31 and 32 also is provided with an internal arcuate face 35 which when the valve is positioned as valve 30 is shown in Fig. 1 is concentric with the axis of the stator 11 and matches with and forms a part of the bore 14. When a valve is thus positioned as valve 30 is shown in Fig. 1 there is a substantial pocket of space closed off in the chamber 18 by the valve occupying the mouth of this chamber. Each of the chambers 18, 19 and 20 is provided with a spark plug 36 which is part of the ignition system of the engine 10.

At opposite ends of the bosses 15, 16 and 17 of the stator 11, annular cylindrical shoulders 40 and 41 are formed on the stator. These shoulders have annular grooves 42 and 43 provided therein and are covered with bands 44 so that the grooves 42 and 43 produce annular closed conduits. Holes 45 and 46 bored inwardly from the conduits 42 and 43 respectively communicate with the bore 14 of the stator 11. The axes of all the holes 45 and the axes of all the holes 46 lie in two planes respectively normal to the axis of the stator 11.

The stator 11 may be provided with any desired means for supporting the same such as the mounting lugs 47 shown in Fig. 1.

The rotor 12 has a cylindrical peripheral surface 50 which makes a smooth sliding fit with the bore 14 and proper means of course is provided for keeping the space between the surface 50 and bore 14 constantly lubricated. It is also to be understood that auxiliary seal means may be necessary to form annular seals on the opposite sides of the planes of the holes 45 and 46 between the stator 11 and rotor 12 but such means have been omitted in the disclosure because of the diagrammatic character of the latter. At any rate the provision of such sealing means is contemplated so that an allowance can be made in the relative diameters of the surface 50 and the bore 14 for expansion of the metal in the stator 11 and rotor 12 due to heat generated in the operation of the engine 10.

Formed radially inwardly from the cylindrical peripheral face 50 of the rotor 12 are four cavities 51, 52, 53 and 54. Each of these cavities has end walls 55 which lie in the same planes as the end walls 21 of compression chambers 18, 19 and 20. These cavities are of two types. Cavities 51 and 53 may be termed combustion-exhaust cavities; and the cavities 52 and 54 may be termed suction-compression cavities. The combustion-exhaust cavities 51 and 53 have floor surfaces 56 which are shaped as shown in Fig. 1 and which are made up of lines normal to the end faces 55 of these cavities.

The suction-compression cavities 52 and 54 have floor surfaces 57 which are shaped substantially as shown in Fig. 1 and are made up of lines normal to the end faces 55 of said cavities.

The shape of the cavity floors 56 and 57 produces four vanes 60, 61, 62 and 63, each of which is provided with a slidable seal bar 64 which engages the bore 14 of the stator 11 and produces a sealed division separating the adjacent rotor cavities. The seal bars 64 are uniformly spaced apart by angles of 90°.

Vanes 60 and 62 may be referred to as intake-exhaust vanes while the vanes 61 and 63 may be referred to as compression-power vanes.

Formed on the rotor 12 and opening into cavities 52 and 54 just behind the seal bars 64 of vanes 60 and 62 is a row of intake ports 70 which are connected by a transverse conduit 71 and a hole 72 with an annular groove 73 formed in the cylindrical peripheral face 50 of the rotor 12. As shown in Fig. 2 the groove 73 lies in the same radial plane as the holes 54 and is thereby constantly connected with the stator conduit 42. The latter conduit is connected, by any desired means (not shown) with a carburetor or other source of supply of gaseous fuel.

Provided in the rotor 12 just in advance of the sealing bar 64 of each of the vanes 60 and 62 is a series of exhaust ports 74 which are united by an axial passage 75 which connects said ports with an annular groove 76 formed in the cylindrical outer surface of the rotor 12. The groove 76 lies in the same radial plane with holes 46 in the stator 11 and is therefore connected by these holes with exhaust conduit 43 of the stator. The conduit 43 is connected by any suitable means (not shown) for conducting exhaust gases from this conduit to a point of discharge.

Each of the rockers 24 has a leg 80 on one of its ends and rods 81 and 82 are pivotally connected at their outer ends to this leg and to the opposite end of the rocker 24. Each of these rods has a roller 83 at its inner end which rollers ride on cams 84 and 85 respectively, which are provided on the rotor 12. These cams are only diagrammatically shown in the drawings but are designed to rock the valves 30, 31 and 32 in coordination with the rotation of the rotor 12 in the stator 11 so as to cause the engine 10 to function in the manner to be described hereinafter.

The ignition system of the engine 10 includes any preferred means of producing the required high tension electric current and a distributor 90 which is diagrammatically shown in Fig. 2 as connected in direct drive relation with the shaft 13 for distributing this electric current to the spark plugs 36 in timed relation with the rotation of the rotor 12.

Operation

The operation of the engine 10 will be explained with reference to the relative positions of the various parts of the engine shown in Fig. 1. The valve 30 is there shown in its neutral position in which it closes the mouth of chamber 18 and presents its inner arcuate face 35 as a portion of the bore 14 permitting the seal bar 64 of vane 60 to ride past said valve in sealing relation therewith. Valve 31 is shown as rocked in counterclockwise direction about its axis into sealing relation with the floor surface 57 of the cavity 52. Valve 32 is shown positioned as when rocked about its axis to bring this into sealing relation with the floor 56 of the cavity 53.

It may be stated as a general proposition that the valves 30, 31 and 32 are controlled by the cams 84 and 85 so that just before any of the vanes 60, 61, 62 and 63 comes opposite one of these valves, this valve is turned into the neutral position occupied by valve 30 in Fig. 1, so that this vane will pass beneath this valve with the sealing bar 64 of that vane in sealing relation with the face 35 of that valve. When one of the vanes 60 or 62 is thus passing under one of the valves, this valve is rotated by the cams 84 and 85 in an anti-clockwise direction immediately as this vane passes beneath the midpoint of the valve so that the wing 33 of this valve moves down into sliding contact with the cavity floor 57 which trails each of the vanes 60 and 62.

When the vane passing under one of the valves 30, 31 or 32 is one of the vanes 61 or 63, the cams 84 and 85 operate on this valve so as to rotate it in a clockwise direction immediately after this vane has passed beyond the wing 34 of this valve so as to cause this wing to ride downwardly on the cavity floor 56 which trails each of these vanes. As each of the vanes approaches one of the valves 30, 31 or 32, the cams 84 and 85 rotate the valve from the position in which it is at that time so as to maintain the valve in sliding contact with the floor of the cavity into which it extends but yet return the valve to the neutral position in which valve 30 is shown in Fig. 1 prior to the arrival of the sealing bar 64 of the approaching vane at the adjacent wing of the valve.

It is desired to stress the fact that, when a valve is in the neutral position in which valve 30 is shown in Fig. 1, the compression chamber in the mouth of which that valve is mounted is thus closed and the valve makes such a snug sealing fit with the walls 21 and 22 of that chamber that gaseous fuel forced into this chamber in the operation of the engine 10 prior to the valve assuming neutral position, is confined within this chamber and has no avenue of escape therefrom until the valve is shifted to permit this.

Assuming that the engine 10 is operating and the rotor 12 rotating in the direction of arrow 95 shown in Fig. 1, the following conditions exist in the four cavities of the rotor 12. Cavity 51 is filled with combustion gases left therein following a power impulse from chamber 18 which terminated with rotation of the valve 30 to neutral position. A portion of cavity 52 located between vane 61 and valve 31 is occupied by a charge of vapor or gaseous fuel which is being compressed by the movement of the vane 61 toward the valve 31. It is to be noted that the portion of the cavity 52 in which the compression is taking place is in direct communication with the compression chamber 19 in which the valve 31 is mounted.

The leading portion of cavity 52 is expanding in volume with the result that gaseous fuel is being sucked into this cavity through the ports 70 in the vane 62.

The portion of cavity 53 located between vane 62 and valve 32 is contracting with the result that gases of combustion remaining in this portion of this cavity are being expelled therefrom through ports 74 in the vane 62.

In the portion of cavity 53 located between vane 63 and valve 32 and in the portion of the combustion chamber 29 which is thus placed in communication with that portion of cavity 53, a power stroke is taking place by the combustion of a charge of fuel in this space by a spark plug 36 mounted within boss 17. As the portion of cavity 53 in which this explosion is taking place is expanding due to rotation of the rotor 12 in the direction of arrow 95, this explosion imparts a rotational impulse to the rotor in the direction of its rotation.

Cavity 54 has just finished having a full charge of gaseous fuel delivered thereto through the fuel intake ports 70 in the vane 60 in the same manner as a charge of fuel is, at the instant illustrated in Fig. 1, being delivered into cavity 52.

A power stroke just having been completed by a charge of gaseous fuel exploded in chamber 18, and the valve 30 just having returned to neutral position at the conclusion of this stroke, chamber 18, at the instant illustrated in Fig. 1, has been left occupied by an approximate vacuum. As the seal bar 64 of vane 60 passes the center of valve 30, cams 84 and 85 will operate on this valve to rotate it in a counterclockwise direction to bring the wing 33 of this valve into sliding contact with the cavity floor 57 of the cavity 54 whereby the end of this cavity occupied by valve 30 will be sealed off in direct communication with the compression chamber 18, whereupon the rotation of the rotor 12, with the vane 63 rapidly approaching the valve 30 will cause the compression of the fuel charge occupying the cavity 54 and the delivery of this charge in compressed condition into the chamber 18, at the time valve 30 is rocked back in the neutral position as the vane 63 arrives at the edge of this valve.

It is believed the mode of operation of the engine 10 is rendered manifest by the above description. It is to be noted that with each passage of one of the vanes 61 or 63 past one of the valves 30, 31 or 32 a power stroke is initiated between this vane and this valve. Thus there are six power strokes in the engine 10 with each rotation of the rotor 12. Since there are four operation cycles for each power stroke, this means that twenty-four operation cycles are performed in the engine 10 during each rotation of the rotor 12.

From the foregoing disclosure it is believed apparent that the present invention provides an extremely simple internal combustion rotary engine in which the four-cycle method of operation commonly requiring reciprocating pistons is performed by the inter-relation of a rotor with a stator and with the assistance of only three positively operated mechanical valves.

While only a single embodiment of the invention is disclosed herein, it is to be understood that this is a diagrammatic disclosure and that many modifications and variations may be made in this without departing from the spirit of the invention or the scope of the appended claims.

The claims are:

1. In an internal combustion engine, the combination of: a stator having a cylindrical bore, there being an odd number of, and not less than three, fuel compression and firing chambers recessed radially outwardly from said bore, surfaces of rotation about an axis parallel with and close to said bore being provided in each of said chambers; a rotary valve slidably fitting in and closing the mouth of each of said chambers, said valve being mounted for rotation about said axis to maintain a substantially fluid tight sliding fit with the internal surfaces of rotation of said chamber, said valve having an arcuate surface forming a continuation of said bore when said valve is neutrally positioned to close said mouth; a rotor mounted for rotation within and in close-fitting relation with said bore, there being an even number of, and not less than four, cavities formed radially inward in the periphery of said rotor in an annular zone thereof which is coextensive axially with said chambers, each of said cavities slidably receiving any of said valves when said cavity is opposite said valve and the latter is rocked about its axis from its neutral chamber closing position; an even number of, and not less than four, vanes provided on said rotor in equally spaced relation circumferentially, said vanes constituting dividing walls between adjacent pairs of said cavities, half of said vanes being intake-exhaust vanes and being arranged about said rotor in diametrically opposed pairs, the other half of said vanes being compression-power vanes and being similarly disposed about said rotor in alternate relation with said intake-exhaust vanes, there being gaseous fuel intake ports in said rotor opening into the cavity just following each intake-exhaust vane, there being exhaust ports in said rotor opening into the cavity just preceding each of said intake-exhaust vanes, there being conduit means in said rotor for maintaining said intake ports in communication with a suitable source of supply of gaseous fuel, and other conduit means in said rotor for conducting exhaust gases from said exhaust ports to a suitable place of discharge; cam means causing each of said valves to be in neutral position and closing the mouth of its chamber when any of said vanes is opposite said valve, said cam means rocking said valve in timed relation with the rotation of said rotor in a given direction as follows: (a) in anti-clockwise direction to follow the trailing face of each intake-exhaust vane to suck gaseous fuel through intake ports in said vane into the cavity thus entered by said valve and admit to the chamber of said valve gaseous fuel being compressed between said valve and a compression-power vane approaching said valve from behind the latter; (b) in a clockwise direction to follow the trailing face of each compression-power vane thereby bringing the chamber of said valve, containing gaseous fuel under compression into communication with a portion of the cavity thus entered by said valve, and separate said portion of said cavity from the portion between said valve and an exhaust-intake vane approaching said valve from behind the latter whereby gases of combustion occupying the latter cavity portion are expelled through the exhaust ports in said cavity just in advance of said exhaust-intake vane; and means operating in timed relation with the rotation of said rotor for igniting the gaseous fuel charge confined in each of said chambers to cause the timely combustion and expansion of said charge as clockwise rotation of the valve of that chamber, as aforesaid, brings said chamber into communication with a portion of one of said cavities.

2. In an internal combustion engine, the combination of: a stator having a cylindrical bore, there being a fuel compression and firing chamber recessed radially outwardly from said bore, surfaces of rotation about an axis parallel with and close to said bore being provided in said chamber; a rotary valve slidably fitting in and closing the mouth of said chamber, said valve being mounted for rotation about said axis to maintain a substantially fluid tight sliding fit with the internal surfaces of said chamber, said valve having an arcuate surface forming a continuation of said bore when said valve is neutrally positioned to close said mouth; a rotor mounted for rotation within and in close-fitting relation with said bore, there being a series of cavities separated by vanes and radially formed inwardly in the periphery of said rotor, said cavities being coextensive axially with said chamber, each cavity slidably receiving said valve when opposite the latter and said valve is rocked counterclockwise to extend one end thereof into said cavity; means for delivering gaseous fuel into a cavity whereby when said valve is rocked into said cavity as the latter starts past said valve, said fuel is compressed in said cavity and delivered into said compression chamber; means actuated in timed relation with the rotation of said rotor for rocking said valve as aforesaid, then returning said valve to neutral position as the vane at the approaching end of said cavity reaches said valve, and then rocking said valve clockwise to follow the reverse face of said end vane of said cavity into the next following cavity; and means actuated in timed relation with the rotation of said rotor for igniting the compressed gaseous fuel charge in said chamber to cause the timely combustion and expansion of said charge as said chamber is brought into communication with said following cavity as aforesaid.

3. A combination as in claim 2 in which means is provided for placing the portion of said first-mentioned cavity which has travelled past said valve in communication with a source of gaseous fuel whereby the expansion of said cavity portion sucks a charge of fuel thereinto for use in a subsequent combustion cycle.

4. A combination as in claim 2 in which means is provided for placing the portion of said following cavity which has not yet travelled past said valve in communication with the atmosphere whereby combustion gases contained in said portion of said cavity as a result of a prior combustion cycle are exhausted therefrom to the atmosphere due to the contraction of said portion of said following cavity.

5. A combination as in claim 3 in which means is provided for placing the portion of said following cavity which has not yet travelled past said valve in communication with the atmosphere whereby combustion gases contained in said portion of said cavity as a result of a prior combustion cycle are exhausted therefrom to the atmosphere due to the contraction of said portion of said following cavity, References Cited in the file of this patent

UNITED STATES PATENTS

| | | |
|---|---|---|
| 892,201 | Welsh et al. | June 30, 1908 |
| 1,629,580 | Lithander | May 24, 1927 |